FIG. 3

INVENTORS
Philip W. Morley
Raymond R. Werner
Drury K. Mitchell

INVENTORS
Philip W. Morley
Raymond R. Werner
Drury K. Mitchell

BY *Q. Baxter Warner*
*Claude Funkhouser*
ATTORNEYS

United States Patent Office 3,038,614
Patented June 12, 1962

3,038,614
MISSILE CART
Philip W. Morley, Washington, D.C., Raymond R. Werner, Haddonfield, N.J., and Drury K. Mitchell, Orlando, Fla., assignors to the United States of America as represented by the Secretary of the Navy
Filed Jan. 29, 1960, Ser. No. 5,577
8 Claims. (Cl. 214—1)

This invention relates to vehicles and more particularly to an improved transportation vehicle for ordnance devices such as torpedoes and guided missiles.

In handling and transporting large ordnance devices such, for example, as topedoes and guided missiles, it is frequently desirable not only to translate the device along horizontal and inclined surfaces such as decks and ramps, but also to elevate the device controllably to a predetermined height above the deck and to rotate the device about its longitudinal axis. It is often necessary, for example, to hoist the device or item to an overhead conveying system such a strong back or to test the interior components, particularly the guidance systems of the ordnance device or item, by means of roll tests, that is, by rotation of the device or item about its longitudinal axis. As an illustrative example, some guided missiles require that the missile be rotated about its longitudinal axis to test the roll rate gyro output, the maximum accelerometer output and the maximum free gyro output. Other ordnance devices such, for example, as a torpedo also utilize guidance systems which frequently contain a gyroscope which may require a roll test prior to launching into a body of water, thereby to determine whether the guidance system is operating correctly.

Ideally the mechanisms necessary to enable such tests to be conducted and the elevating equipment mentioned hereinbefore are incorporated as part of the vehicle which is utilized to move the ordnance item from its storage or assembly location to its position of ultimate launching.

Accordingly, it is an object of the present invention to provide a new and improved vehicle which will allow large cylindrical devices to be easily moved.

Another object of the present invention is to provide an ordnance handling vehicle which will permit the ordnance device or missile to be translated along a surface and controllably elevated to a selected height above the surface of a floor or deck.

Another object of the present inventtion is to provide an improved ordnance handling vehicle which will permit the ordnance device to be rotated around its longitudinal axis with a high degree of control.

A further object of the instant invention is to provide an improved ordnance handling vehicle which will permit a cylindrical ordnance device to be simultaneously and controllably translated along a supporting surface, elevated above that surface and rotated about the longitudinal axis thereof.

A further object of the present invention is to provide an improved vehicle of the character described wherein the system utilized to translate, elevate and rotate the ordnance device is supplied with power other than by means of manual handling or manpower.

A still further object of the instant invention is to provide an improved vehicle which will permit an ordnance item to be translated, elevated and rotated either simultaneously or in any sequence and wherein the system utilized to elevate and rotate the ordnance item is located on the vehicle.

A still further object of the instant invention is to provide an improved ordnance moving vehicle which will allow the ordnance item transported to be rotated to any degree of orientation about its axis and to be maintained or locked in a preselected position.

A still further object of the instant invention is to provide a system for rotating a missile during its transportation on a missile handling vehicle and to perform the movement with a high degree of control and accuracy.

Still another object of the instant invention is to provide a system for rotating an ordnance device while positioned on its transporting vehicle, and which is equipped with an emergency stop having precedence over the other controls.

Other objects and many of the attendant advantages of this invention will be readily appreciated as the same becomes better understood by reference to the following detailed description when considered in connection with the accompanying drawings wherein:

It should be understood at the outset that the embodiment illustrated is merely one form that the instant invention may take and is not to be construed as limiting but all forms within the scope of the appended claims are to be considered within the scope of the invention.

Referring now to the drawings and more particularly to FIGS. 1, 1A, 2 and 2A, the illustrated embodiment comprises a vehicle having a rectangular chassis 10 of structural steel or other strong material with a load supporting elevatable frame 11 superimposed thereon. The elevatable frame 11 may be provided with a forward saddle support 12 and two after saddle supports 13 and 14 preferably spaced such that an ordnance missile may be transported at preselected strong points or reinforced portions provided in the missile casing.

A roll ring 15 is carried by the saddle supports 13, it being understood that a ring similar to ring 15 may be employed in connection with saddle 14. For example, both of the saddles 13 and 14 may carry a ring, if desired. A ring 16 similar to ring 15 is carried by saddle 12, the aforesaid ring arrangement being adapted to support the ordnance device in a surrounding or circumferential relationship. The aforesaid roll rings may be formed in a suitable manner, preferably, in three segmental sections 17 each of approximately 120 degrees bolted together by bolts 18 and flanges or lugs 19 to allow the ordnance item to be removed from the vehicle in an upward direction. By arranging two after saddles 13 and 14 on the elevatable frame 11 it is obvious that the after roll ring can be supported in either of the after saddles to provide at least two points at which the ordnance device or missile may be supported on the frame 11.

Pivotally connecting the elevatable frame to the chassis proper are four crisscrossed lifting members 21 and 22 arranged in pairs pivoted together, as at 20 which cooperate in a manner somewhat similar to a conventional scissor jack whereby the frame 11 may be raised or lowered, as desired. The forward ends of members 21 and 22 are pivotally connected to elevatable frame 11 and chassis 10, respectively, while the after ends of members 21 and 22 carry rollers 23 and 24 designed to roll in ways or roller guides 25 and 26 provided in the structure of the frame and chassis similar to the arrangement disclosed and claimed in copending application of Philip W. Morley et al., Serial No. 813,610, filed May 15, 1959, now abandoned for Booster Cart.

The forward saddle support may be provided with a brake arrangement generally indicated by the reference character 27 and which will be described more fully hereinafter to permit the forward roll ring to be locked or held in any angular position. Approximately midway of the chassis structure there may be provided a pair of wheels 28 preferably of laminated fiber or some other material having high load carrying characteristics and a low coefficient of friction to provide for ready mobility of the vehicle.

A pair of adjustable casters 29 are preferably located on either end of the chassis structure to allow for stabilizing or leveling the vehicle if desired. The casters may be provided with a screw or ratchet type elevating spindle 31 and an actuating handle 32 to enable the casters to be elevated or lowered as desired.

Figure 1:
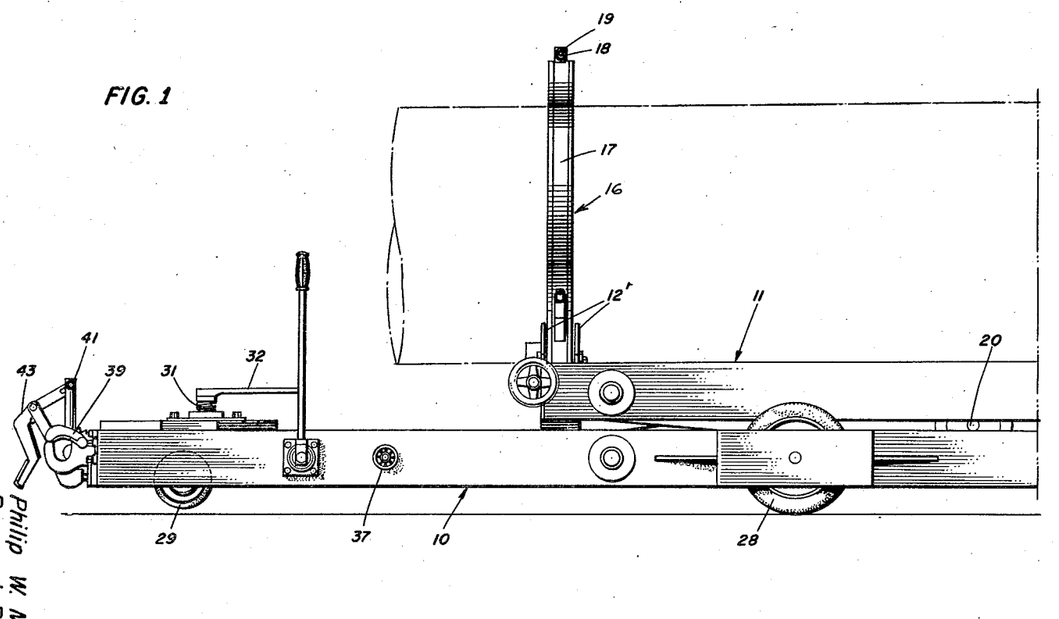
FIG. 1 is a side elevational view of the vehicle constructed in accordance with the present invention and illustrates the forward end of the device.
Figure 1A:
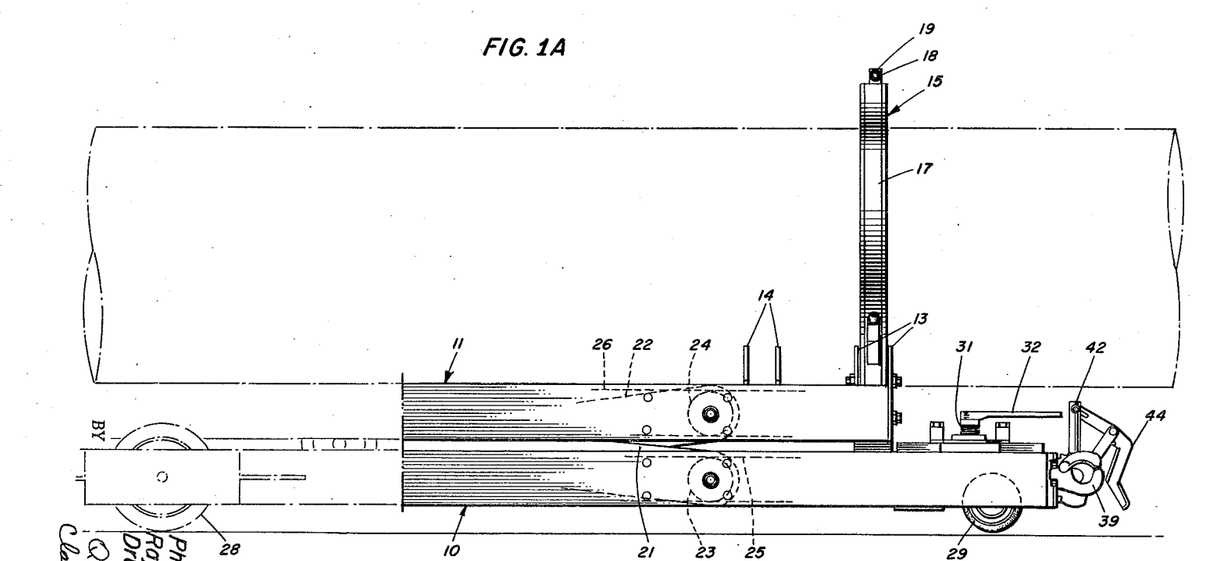
FIG. 1A is a side elevational view of the rear end of the vehicle.
Figures 2, 7:
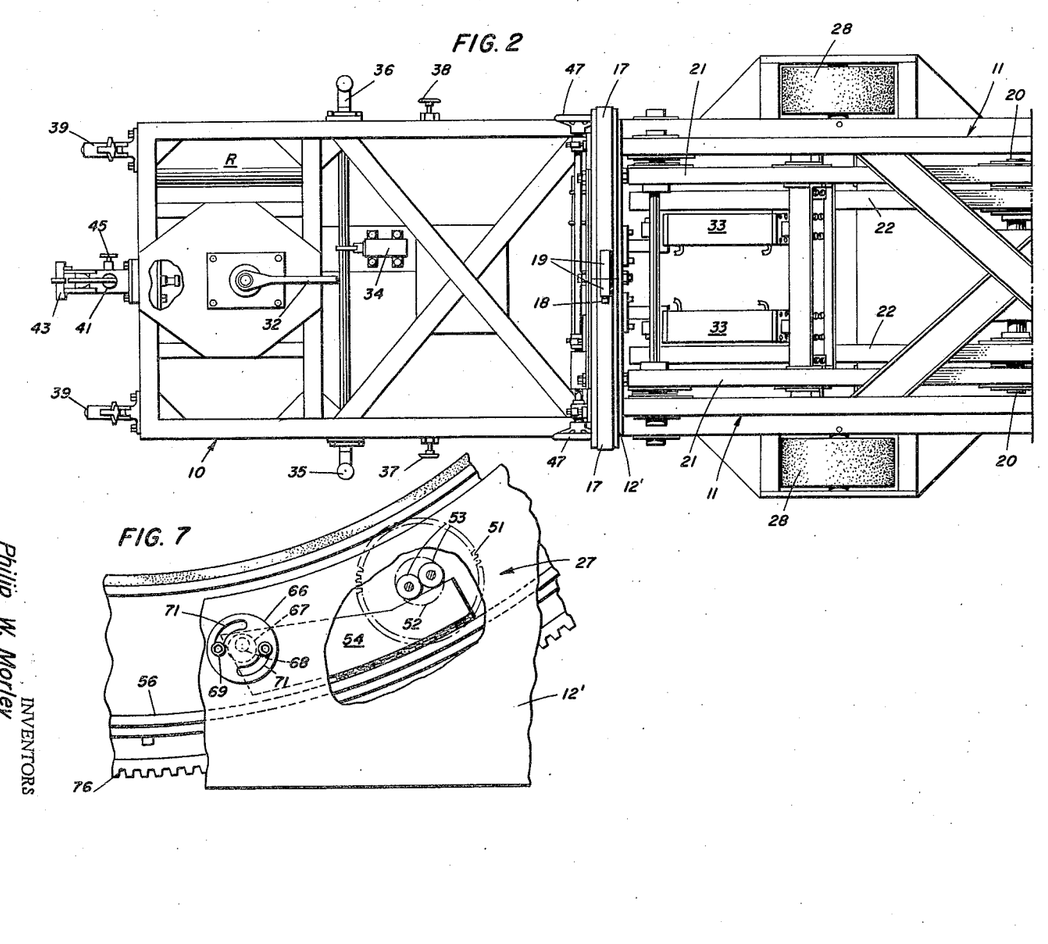
FIG. 2 is a plan view of the forward end of the vehicle.
FIG. 7 is a fragmentary view partially in elevation and partially broken away illustrating the brake shoe and the cam actuators.
Figure 2A:
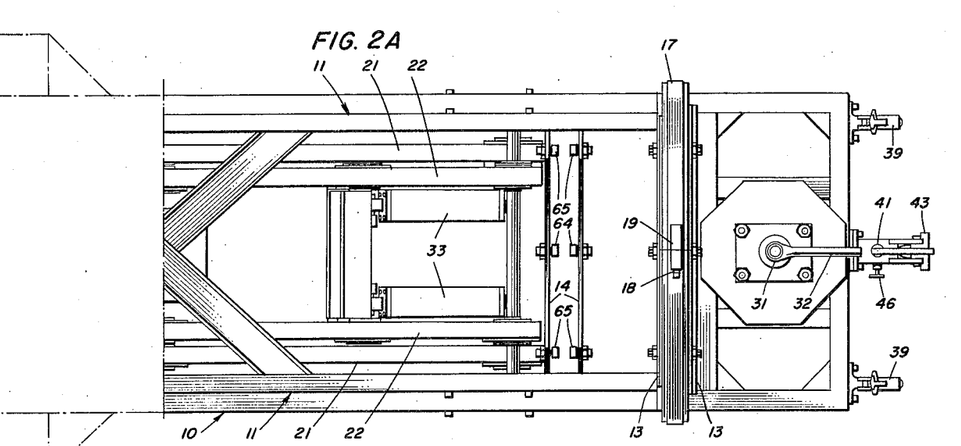
FIG. 2A is a plan view of the rear end of the vehicle.
Figure 3:
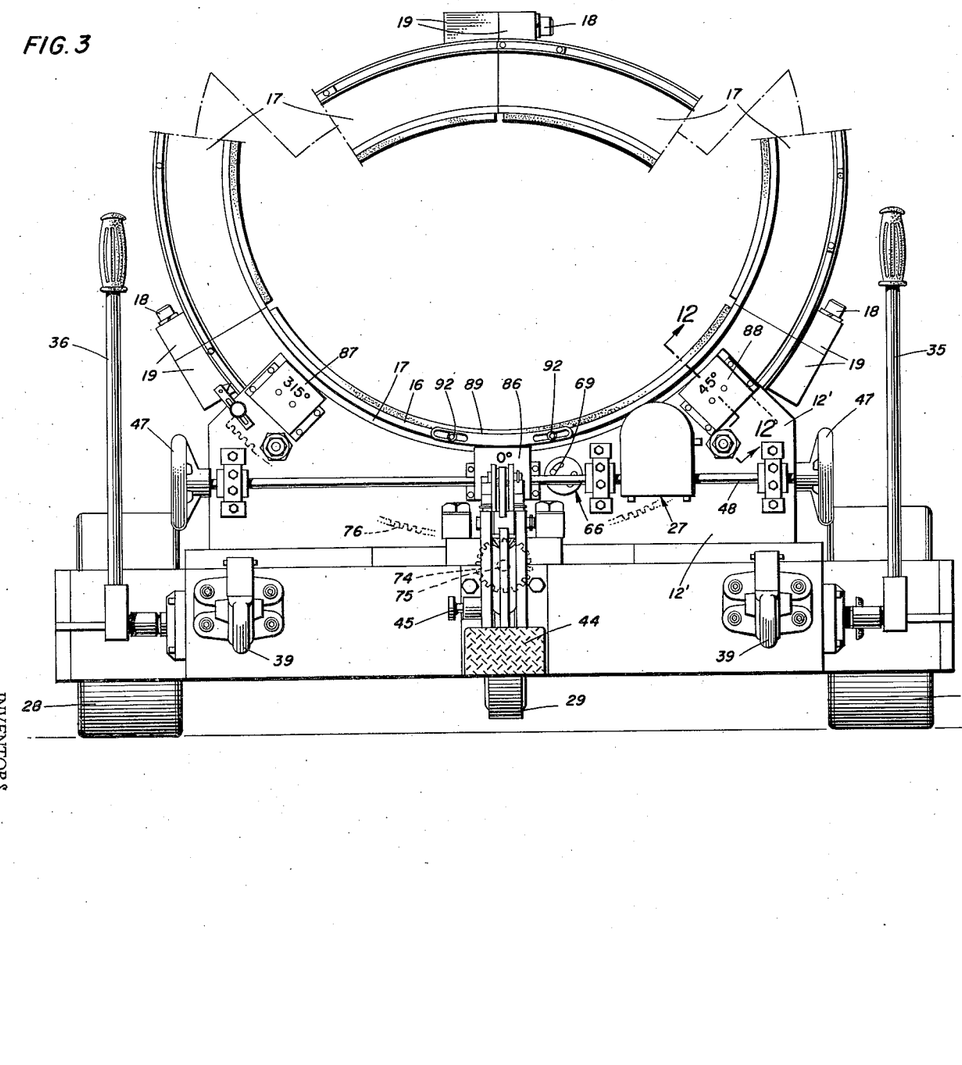
FIG. 3 is a front elevational view of the device of FIG. 1.

A plurality of fluid actuated cylinders 33 are preferably provided to raise and lower the elevatable frame. The cylinders may be connected to the chassis 10 and to the elevatable members 21 and 22 as best shown in FIG. 2, to permit a raising and lowering motion to be imparted to the load supported by elevatable frame 11. A pump 34, here illustrated as a hydraulic pump, may be located on the chassis structure as shown and which when actuated by manually operated handles 35 and 36 will provide fluid under pressure to the lifting cylinders by means of conventional piping (not shown), the actuating handles for the pump being located on either side of the chassis structure, as best shown on FIGS. 1 and 3. A pair of release valves 37 and 38 are preferably mounted on opposite sides of the chassis structure so that the elevatable frame 11 may be raised or lowered from either side of the chassis, the aforesaid valves being connected to the fluid lines or piping in any suitable manner. The release valves 37 and 38 may be of any conventional type and which are constructed and arranged to bypass fluid from the lifting cylinders 33 back into a reservoir R. The hydraulic fluid reservoir R may be conveniently positioned in the forward corner of the chassis structure to provide an abundance of operating fluid for the pump and its associated cylinders 33, it being understood that the reservoir is connected to pump 34 and cylinders 33 by suitable piping.

A pair of tub hooks or pintle hooks 39 are provided on each end of the chassis frame to permit the vehicle in a loaded or unloaded condition to be pushed or towed by a conventional towing truck or tractor (not shown).

A pair of lateral indexing mechanisms comprising spring loaded pins 41 and 42, foot pedals 43 and 44, and release pins 45 and 46 may be located on each end of the vehicle to permit the vehicle to be definitely placed and locked in position on a missile handling deck or floor, as the case may be. Upon releasing the spring lock the indexed pin may be dropped into a prepositioned socket (not shown) in the deck or floor, as the case may be, and the vehicle is thus definitely located to facilitate handling and testing procedures.

Referring now more particularly to FIGS. 3, 5, 6 and 7, the forward saddle support 12 is provided with a brake actuating handwheel 47 disposed on opposite sides thereof which through brake operating shaft 48 and brake worm 49 supplies a rotative force to worm gear 51. The worm gear 51 is connected by suitable shafting 52 to a pair of cam follower type rollers 53 which are in contacting engagement with brake shoe 54. The brake shoe 54 is pivoted on a pin 68 and upon rotation of gear 51 may be brought to bear against one of the annular flange surfaces 56 formed on the roll ring 16 to frictionally hold the forward roll ring in any desired angle of rotational position as will be hereinafter more fully set forth. A spring may be used for the purpose of preventing the brake 54 from dragging on flange 56, or, if desired, any conventional means for accomplishing the desired result may be used. The brake 54 will tend to drag on flange 56 if no such an arrangement is provided, however, since the brake is not particularly heavy no adversities will result from such an arrangement. As is clearly shown in FIGS. 8, 9 and 12, roll ring 16 is preferably rotatably supported on saddle 12 by a plurality of hold-down and supporting rollers 57 and 58, respectively the aforesaid rollers 57 and 58 being supported on plates 12', as at 59 and 61 with rollers 57 disposed on the longitudinal axes of the cart and rollers 58 disposed in proximate relation with respect to the outer edges of plate 12'.

Figure 8:
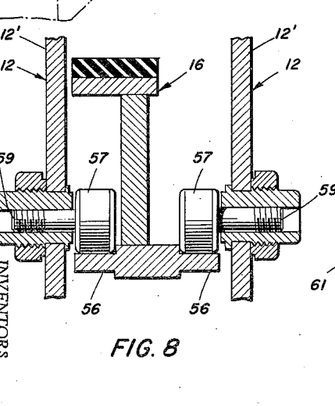
FIG. 8 is a sectional view taken along the line 8—8 in FIG. 5 illustrating the hold-down rollers for the forward roll ring.
Figure 9:
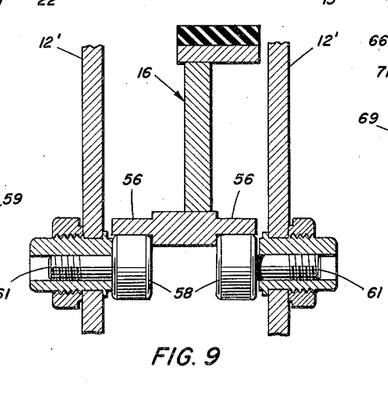
FIG. 9 is a sectional view taken along the line 9—9 of FIG. 5 illustrating the support rollers for the roll ring.
Figures 11, 12, 13:
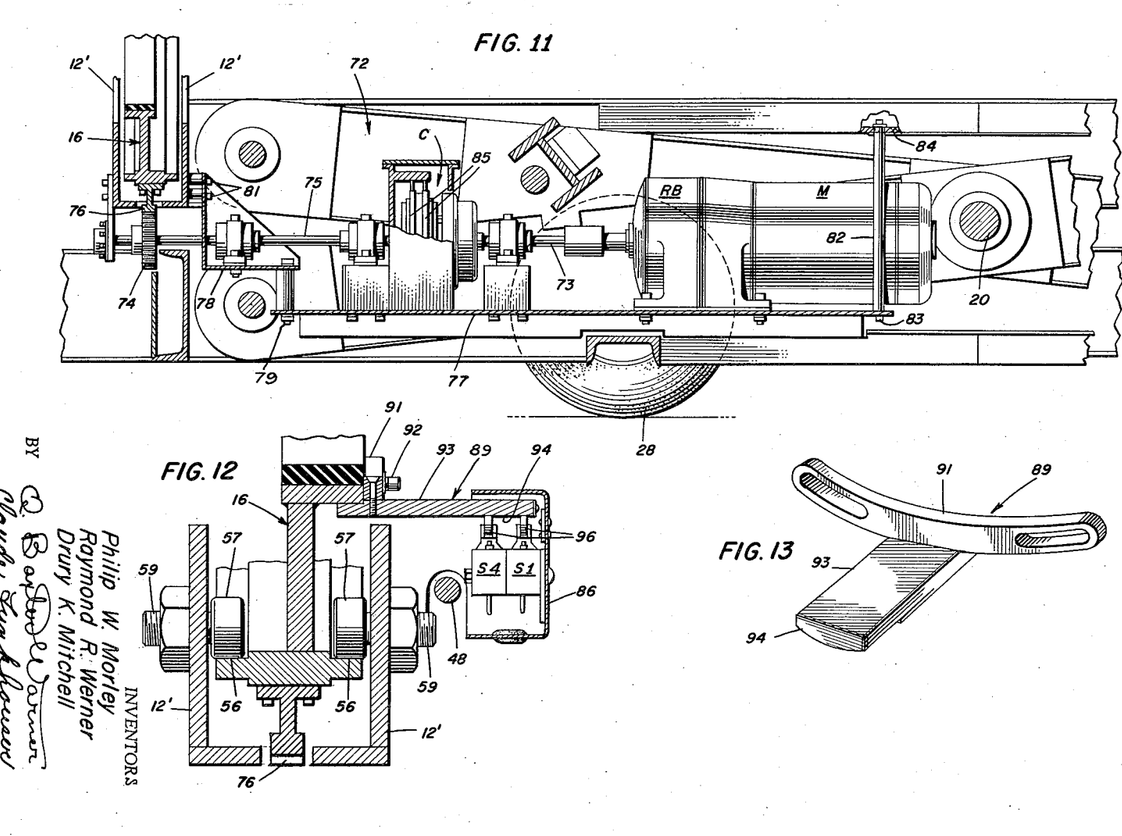
FIG. 11 is a sectional view taken on the line 11—11 of FIG. 4.
FIG. 12 is a sectional view taken along the line substantially corresponding to the line 12—12 in FIG. 3, illustrating one group of switches and the actuating device therefor.
FIG. 13 is a view in perspective of the adjustable switch actuating device.

As shown in FIGS. 8 and 12, rollers 57 are in engagement with the inner surfaces of flanges 56 of ring 16, rollers 58 being in engagement with the outer surfaces of flanges 56 of ring 16, FIG. 9. By the aforesaid roller arrangement the roll ring 16 is rotatably supported by saddle 12 and positive control of the roll ring 16 is insured during rotation thereof. It will be understood that saddles 13 and 14 are each provided with rollers 64 and 65 similar to rollers 57 and 58 whereupon roll ring 15 may be rotatably supported on saddle 13 and an additional ring (not shown) may be rotatably supported on saddle 14, if desired.

Figure 6:
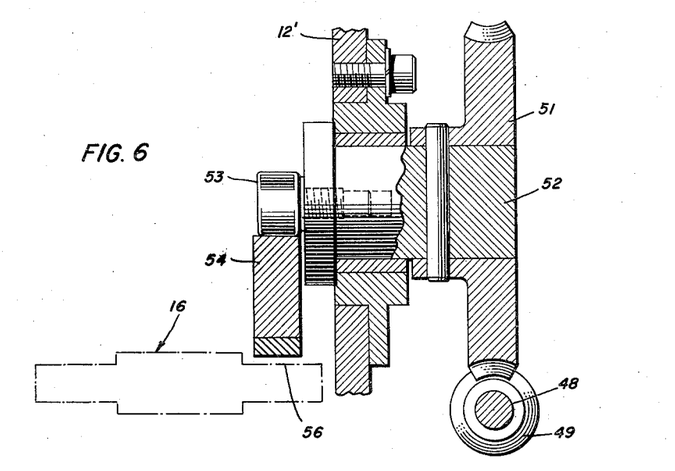
FIG. 6 is a cross-sectional view taken along the line 6—6 of FIG. 5 and illustrating the brake worm gear and the brake shoe actuating cams.
Figure 10:
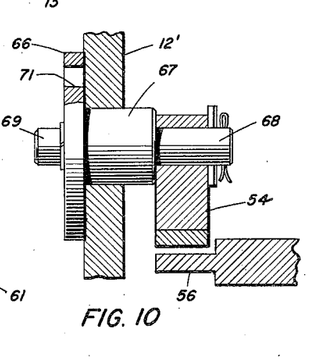
FIG. 10 is a cross-sectional view taken along the line 10—10 in FIG. 5 showing the brake adjustment mechanism.

The brake shoe 54, FIGS. 6, 7 and 10, is adjustably mounted on one of the plates 12' of saddle 12, the adjusting device comprising a circular plate 66 provided with a journal 67 carried by plate 66 and rotatably supported in the aforesaid plate 12'. The journal is provided with a pin 68 eccentrically mounted thereon and attached to the brake shoe in any suitable manner such, for example, as by a washer and cotter pin, as best shown on FIG. 10. The plate 66 is adjustably secured to the aforesaid plate 12' by a pair of screws or the like 69 carried by plate 12', with each screw operating in a slot 71 formed in the plate or disc 66. By this arrangement and depending upon rotation of the plate 66 it will be apparent that the pivot end of the brake shoe may be adjusted with respect to the flange 56 cooperating therewith.

Figure 4:
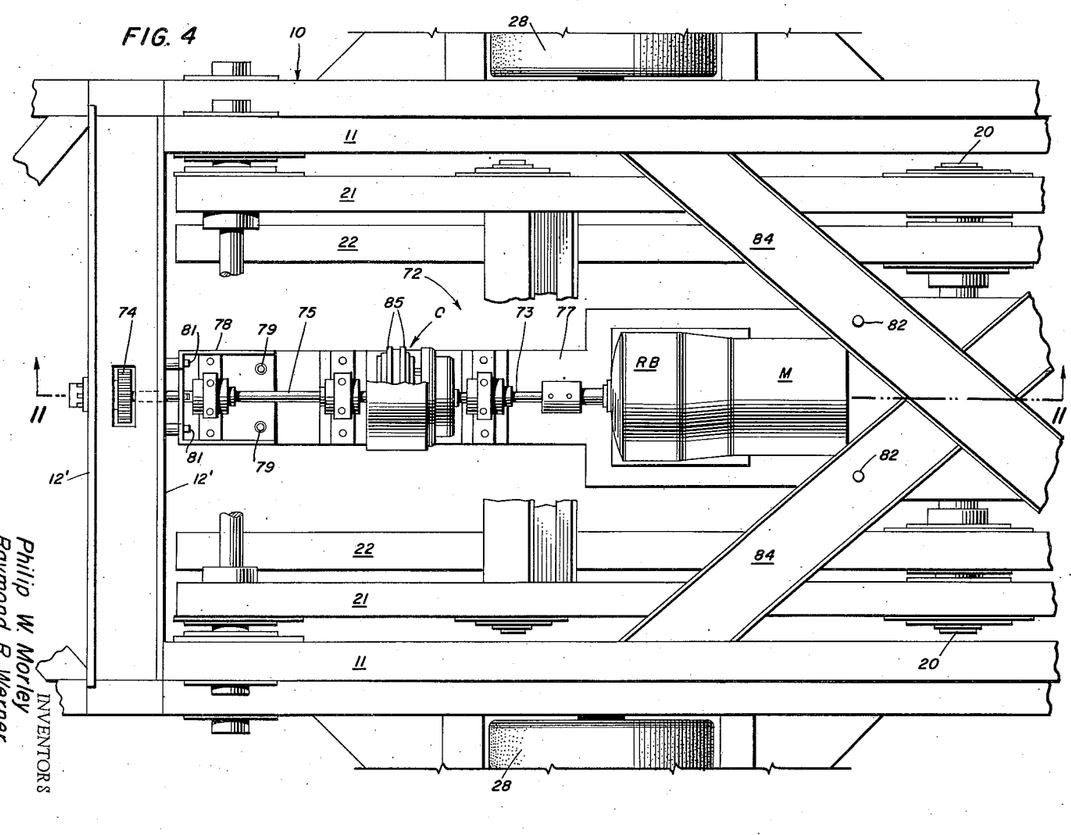
FIG. 4 is a fragmental plan view illustrating the roll ring actuating motor and transmission assembly.
Figure 5:
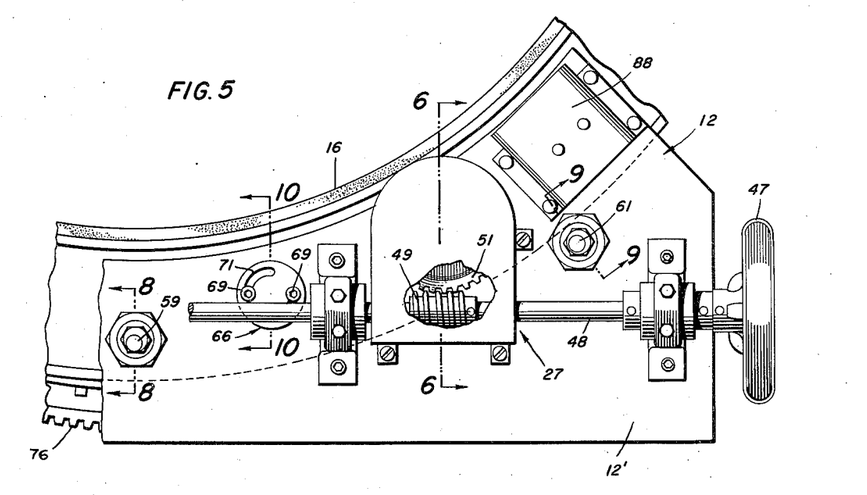
FIG. 5 is a fragmental view with parts broken away showing the forward saddle and the actuating mechanism for the roll ring brake.

Reference is now made to FIGS. 4 and 11 wherein a missile cart roll mechanism is generally indicated by the numeral 72 and comprises an electric motor M, a gear reduction box RB, a drive shaft 73, a conventional magnetic clutch C connected to the drive shaft 73, and a drive spur gear 74 carried on one end of the operating or clutch shaft 75. A rack 76 carried by roll ring 16 may be either in segmental form or in a completely surrounding relationship to the aforesaid roll ring, the rack 76 being in driven engagement with the gear 74, thereby to rotate the ring 16. The roll mechanism 72 is mounted on an appropriate bed plate 77 which may be located along the longitudinal center line of the vehicle between the hydraulic lift cylinders 33. The bed plate may be suitably attached to the upper elevating frame 11, such, for example, as by a bracket 78 secured to the bed plate, as at 79 and to the saddle 12, as at 81 and by a pair of mutually spaced rods or hangers 82 secured to the bed plate, as at 83 and to cross braces 84 carried by the elevating frame 11. By the aforesaid arrangement it will be apparent that the roll mechanism and component parts thereof will move with respect to the movement of the elevating frame 11. A typical arrangement for rotating the average ordnance device such as a large guided missile may comprise a ¼ horsepower, 115 volt, 60 cycle induction motor preferably equipped with a conventional magnetic brake, not shown, on the end opposite the output shaft 73 that may be automatically applied when the armature is de-energized. Preferably also the gear reduction unit may comprise an integral gear head at the output shaft end which will reduce the output speed to a nominal rate of speed such, for example, as 68 r.p.m. The motor drives the missile vehicle forward roll ring 16 through the clutch C by means of the spur gear 74 meshing with the segment of gear rack 76 attached to the outside diameter of the roll ring. The arc of the gear or rack is confined to substantially 50 degrees each side of the zero degree position of what would be the flight attitude of the ordnance missile, and thus the rack is of sufficient size so that the power drive may roll the missile substantially 45 degrees in each direction.

The purpose of the magnetic clutch is two-fold. It limits the starting and braking torques to a value that prevents the maximum acceleration/deceleration from exceeding the allowable limits of $450°/sec.^2$, and also the clutch provides a quick means of disengaging the motor drive from the roll ring to permit slewing the missile manually through a full revolution. The clutch is preferably of the magnetic type which may be equipped with coils that hold the face plates 85 in contact when they are energized. By varying the current through these coils the contact pressure between the plates is controlled, which, in turn limits the torque transmitted by the clutch. When starting or stopping, if the shaft torque exceeds the maximum allowable value, the two pressure plates 85 will slip with respect to each other until the torque has dropped to the value set in the clutch. The normal condition of operation is for the pressure plates 85 to slip only during the acceleration and deceleration periods and not during the interval of constant angular velocity motion between the two plates. When the clutch coils are de-energized, any conventional means such as springs (not shown) may be employed to force the two pressure plates 85 apart and thus disengage the drive connection between the clutch and the roll ring.

The arc of roll motion may be controlled by a plurality of roller actuated switches, generally termed microswitches, enclosed in casings or shields 86, 87 and 88 mounted on the forward plate 12' of the forward saddle 12. Switch casing 86 is mounted on plate 12' at a zero degree position, switch casing 87 at a 315 degree position and switch casing 88 at a 45 degree position, switch casing 88 containing a limit switch S1, switch casing 87 containing a limit switch S2 and switch casing 86 containing a limit switch S3. Each of the aforesaid switches are actuated by an actuating device generally indicated by the numeral 89 mounted on the forward roll ring 16. The actuating device comprises a plate 91 adjustably mounted on the roll ring 16, as by bolts 92 and provided with an arm 93 extending outwardly from the plate 91 and having formed on the terminal end thereof a cam 94 for operating the aforesaid switches S1, S2 and S3, as the cam 94 engages each switch roller device 96 associated therewith during the rotation of the ring 16. Also located at each position, but in a different radial plane from the switches S1, S2 and S3, there is provided a second set of switches S4, S5 and S6 identical to the limit switches S1, S2 and S3, and which are also actuated by the same cam 94.

It will be noted, FIG. 12, that the aforesaid switches are arranged in pairs or groups with S1–S4 in the first group, S2–S5 in a second group and S3–S6 in a third group, the first group being disposed at a 45 degree position, the second group being at a 315 degree position, and the third group being at a center or zero degree position. The aforesaid switches are employed to provide a signal to the control or checkout equipment, indicating that the ordnance device is within plus or minus 2 degrees of the desired position. The aforesaid switch casings are each fabricated in such a manner as to protect the switches and roller devices 96 from damage.

The cam 94 which actuates both the positioning and position indicating switches S1, S2, S3, S4, S5 and S6, as shown, is attached to the forward roll ring 16 and extends horizontally forwardly therefrom. The surface of cam 94 is in the same radial plane as the ordnance device positioning switches and is of sufficient size to extend a predetermined amount on each side of a zero index mark to actuate these switches far enough in advance to allow the ordnance device to decelerate and stop at a selected position. The aforesaid cam surface may be constructed so that standard ordnance devices of the size indicated hereinbefore under all conditions of testing will stop within the allowable tolerance of the position.

Figure 14:
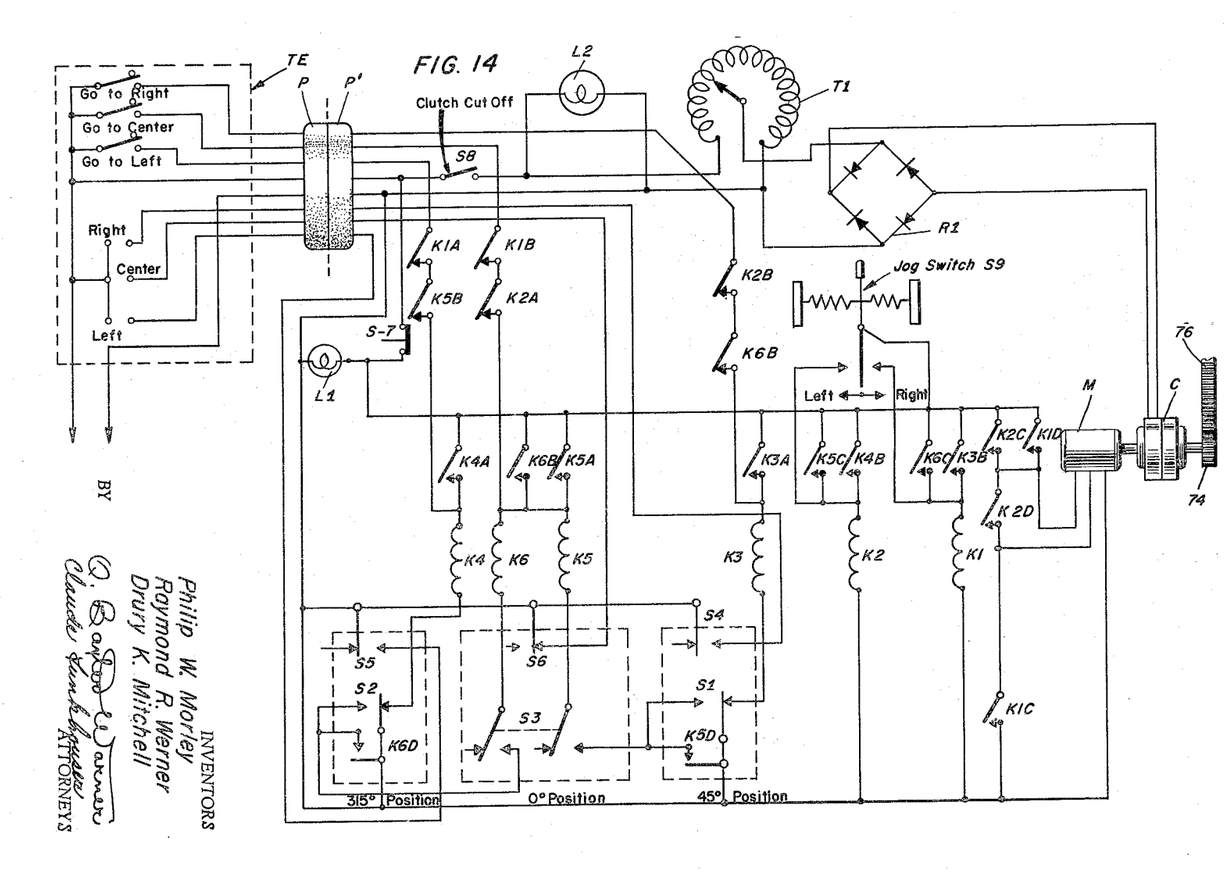
FIG. 14 is the electrical circuit used to supply impulses to the roller ring apparatus shown in FIGS. 11 through 14.

Referring now to FIG. 14 for a more complete understanding of the operation of the invention, wherein, there is shown a schematic diagram of an electric circuit for controlling the missile cart roller mechanism to perform a test used with a guided missile. The switches S1, S2, S3, S4, S5 and S6 are shown in a position when the missile is in a state of rest or at the zero degree position. The necessary cable to connect the control equipment with the missile's vehicle may terminate in an eight contact female plug P which mates with a companion male receptacle P' located on the cart. The plug may have a catch which locks it in position when plugged in and the receptacle may be equipped with a cover which is locked at all times, except when the missile is under preloading tests. The magnetic clutch C may be energized through the autotransformer T1 and the rectifier R1. The secondary of the autotransformer may be adjustable so that the current to the magnetic clutch may be limited to a value that will permit only a preset amount of torque to be transmitted with the motor drive to the load. The operation of the control circuit shown in FIG. 14 to rotate the missile to a 45 degree position is as follows: with the missile in either the zero or 315 degree position, the command to go to the 45 degree position is given when the test equipment TE closes the contacts in the "Go to right" command circuit, the coil of relay K3 is energized. This coil closes the normally open contacts K3A and keeps the relay coil energized when the "Go to right" command contacts reopen. It also closes the normally open contact K3B which energizes the coil of relay K1. Normally closed contacts K1A and K1B, in the left and center command circuits, open so that any new command made before the 45 degree position has been reached will be ineffective. The normally open contacts K1C and K1D close and arrange the 3-lead motor connector for proper rotation of the motor. The motor M will continue to rotate the missile to the right until the actuating cam 94 on the roll ring 16 opens limit switch S1. Opening this switch de-energizes the coil of relay K3 which causes contacts K3A and K3B to open. The opening of K3B de-energizes the coil of relay K1 which resets the three command circuits by closing contacts K1A and K1B, and stops the motor by opening contacts K1C and K1D. The control circuit is now reset to accept further commands. If the missile was originally at 315 degree position the opening of the limit switch S3, as the actuating cam passes through zero degree position, will have no effect as relay K3 remains energized. When the missile reaches a position of 2 degrees before the 45 degree position, the position indicator switch S4 is closed by the cam actuator on the roll ring and the "At Right" position circuit is energized indicating to the TE equipment that the missile is within the 2 degree tolerance of the desired position. While at the 45 degree position any closure of the contact in the "Go To Right" command circuit of the TE equipment will be ineffective as switch S1 will be opened.

To rotate the missile to the 315 degree position, with the missile at either the zero degree or 45 degree position, the command to go to the 315 degree position is given when the TE equipment closes the contacts in the "Go To Left" command circuit. The operation of the circuits containing relays K4 and K2 and switches S2 and S5 is similar to the above-described operation. Thus, when the "Go To Left" command circuit is closed, the coil of relay K4 is energized. This coil closes the normally open contacts K4A and keeps the relay coil energized when the "Go to Left" command contacts reopen. It also closes the normally open contact K4B which energizes the coil of relay K2. Normally closed contacts K2A and K2B, in the center and right command circuits, respectively, open so that any new command made before the 315 degree position has been reached will be ineffective. The normally open contacts K2C and K2D close and arrange the 3-lead motor connector for proper rotation of the motor. The motor M will continue to rotate the missile to the left until the actuating cam 94 on the roll ring 16 opens limit switch S2. Opening this switch de-energizes the coil of relay K4 which causes contacts K4A and K4B to open. The opening of K4B de-energizes the coil of relay K2 which resets the three command circuits by closing contacts K2A and K2B, and stops the motor by opening contacts K2C and K2D.

For the sake of simplicity, the description of the operation of rotating the missile to the zero degree position will be confined to the missile starting from the 45 degree position, it being understood that the operation with the missile starting from the 315 degree position is similar. The command to go to the zero degree position is given when the TE or checkout equipment closes the contacts in the "Go To Center" command circuit. The coil of relay K5 is energized because the normally open contacts of limit switch S1, located at the 45 degree position, are closed by the cam actuator 94 on the roll ring 16. Relay K6 is not energized because the normally open contacts of limit switch S2, located at 315 degree position, are open. The normally open contacts K5A close and keep the relay coil energized when the "Go To Center" command contacts reopen, and concurrently therewith, the "Go To Left" command circuit is inactivated by the opening of the normally closed contacts K5B. It also closes the normally open contacts K5D which parallel the normally open contacts of switch S1 and maintains the circuit through the coil when the missile leaves the 45 degree position. Normally open contacts K5C close and energize the coil of relay K2 which opens the command circuits and close switches K2C and K2D to thereby arrange the motor leads for proper driving direction. As previously indicated and described, the motor M will continue to rotate the missile to the left until the actuating cam on the roll ring opens limit switch S3. The opening of switch S3 de-energizes the coils of relay K5 and the whole control circuit is reset in the manner previously described. The closure of the position indicator switch S6 signals the TE equipment that the missile is at the desired position. The switch S8 is a toggle type switch which cuts off the current to the magnetic clutch C. The switch S7 is a push button manual reset emergency stop which is located so as to cut off the current to the drive motor and control circuit. It will not cut off the current to the clutch C because, in such a case, the clutch would disengage and the roll movement of the missile might cause the latter to continue to rotate freely. The switch S9 is a spring return to center lever type switch which permits the missile to be controlled manually. It facilitates bringing the missile to flight attitude during the pre-test preparation. The switch is mounted in a covered recess in the control box to prevent accidental operation thereof. L1 and L2 are indicator lights to give a visual indication when the A.C. and D.C. portions of the circuit are energized.

All the components of the electrical system, except the clutch and control circuits indicator lights, the emergency stop switch, the jog switch, the clutch circuit cutoff switch and the power receptacle, are installed in a sturdy sheet metal cabinet. This cabinet is attached to the lower frame and runs transversely between the side stringers in the space immediately in front of the rear caster mounting plate. The items excepted above will be mounted in a sheet metal box which is attached to the right side stringer of the upper frame just above the main wheels.

From the foregoing, it will be apparent that a new and improved cart has been devised for transporting and handling ordnance devices such, for example, as the type containing a guidance system, wherein the devices may be transported along horizontal and inclined decks or ramps, elevated to a predetermined height above the deck or ramp, as the case may be, and rotated about the longitudinal axis thereof to test the roll rate gyro output, the maximum accelerometer output and the maximum free gyro output.

Obviously many modifications and variations of the present invention are possible in the light of the above teachings. It is therefore to be understood that within the scope of the appended claims the invention may be practiced otherwise than as specifically described.

What is claimed is:

1. A vehicle for transporting a missile comprising a chassis, a plurality of wheels intermediate the ends of said chassis, an elevatable caster at each end of said chassis and located on the center line thereof, independent means for elevating each of said casters, an elevatable frame carried by said chassis, a plurality of circular segmented supporting devices in clamping engagement with the missle and rotatably mounted on said frame, the segments of said supporting devices being releasably secured to one another to form a complete circle, means carried by said frame for rotatably supporting said circircular supporting devices on the frame, means operatively connected to the frame and chassis for raising and lowering the frame and the supporting means thereby to move the missile to a desired position with respect to the chassis, means including a motor for rotating at least one of said plurality of circular supporting devices, brake means in engagement with said one of the plurality of circular supporting devices for locking said one device in a preselected position, said brake means including a brake shoe pivotally mounted at one end thereof to said frame and having a cam surface thereon, a cam roller assembly adjustable with respect to said cam surface to move said brake shoe into braking and locking engagement with at least one of said supporting devices, and means for actuating said cam rollers into and out of braking and locking positions.

2. A vehicle for transporting a missile comprising a frame, a first circular missile clamping and supporting device carried by said frame, a second circular missile clamping and supporting device in mutually spaced relation with respect to said first circular supporting device carried by said frame, each of said circular supporting devices including a plurality of arcuate segments releasably secured to one another to form a complete circle, a means including a plurality of hold-down and supporting rollers for rotatably supporting said first and second circular supporting device, means including a motor operatively connected to said first circular supporting device for imparting rotary movement thereto, brake means movable into braking and locking engagement with said first circular supporting device for locking the first device in a selected position, said brake means including a brake shoe pivotally mounted at one end thereof to said frame and having a cam surface thereon, a cam roller assembly adjustable with respect to said cam surface for moving said brake shoe into braking and locking engagement with at least one of said supporting devices, and means including an actuating shaft rotatably mounted on said frame and drivingly connected to said cam roller assembly for actuating the cam roller assembly into and out of braking and locking positions, means including a plurality of switches selectively operated as the first device is rotated for controlling the rotation of the first device, means carried by said first device and movable into engagement with said switches during rotation of the first device for operating said switches, means including an electrical circuit operatively connected to said switches, and motor control means included in said circuit for causing said motor to be driven in either direction.

3. A vehicle for transporting and rotating a cylindrical missile comprising a rectangular shaped mobile chassis, a movable frame pivotally connected to the chassis, a pair of mutually spaced supports carried by said frame, a pair of circular missile clamping members rotatably mounted in said supports, respectively, each of said clamping members including a plurality of arcuate segments releasably secured to one another to form a complete circle, means including a plurality of rollers carried by each of said supports in engagement with their respective clamping members for rotatably mounting said clamping members on the support, means including a motor in driving connection with one of said clamping members for rotating said one member in either direction, switch means mounted on one of said supports and selectively operated by said one member for controlling the degree of rotation thereof, adjustable means mounted on said one member, cam means carried by said adjustable means and engageable with said switch means for selectively operating said switch means, brake means including a cam surface and a brake shoe pivotally mounted on said one support and movable into braking locking engagement with said one member for locking said one member in a preselected position, cam rollers mounted on said one support and adjustable with respect to said cam surface for moving the brake shoe into braking and locking engagement with said one member, means including an actuating shaft rotatably mounted on said one support and drivingly connected to said cam rollers for actuating the cam rollers into and out of braking and locking positions, and means including a plurality of command circuits connected to said switch means and motor and controlled by said switch means for rendering the motor ineffective when said one member is rotated a predetermined amount.

4. A vehicle for transporting a cylindrical missile comprising a rectangular-shaped mobile chassis, a movable frame pivotally connected to the chassis, a pair of annular members rotatably supported on said frame for supporting and clamping the missile for rotation about its longitudinal axis, means including a plurality of rollers in engagement with said members for rotatably supporting the members on said frame, means including a motor in driving connection with one of the annular members for rotating said one member in either direction from an initial position to a final position so that the other members and the missile rotate therewith, braking and locking means movable into engagement with said one member for locking said one member in a preselected position, said braking and locking means having a cam surface, cooperating cam rollers pivotally mounted on the frame in engagement with said cam surfaces for moving the braking and locking means into and out of engagement with the annular member, an actuating shaft rotatably mounted on the frame and having a worm gear secured thereto, a gear carried by the frame in engagement with said worm gear and operatively connected to said cam rollers for actuating the cam rollers, a control circuit, switch means mounted on the frame and connected to the control circuit and said motor for stopping the motor as the switch means are actuated, a plate mounted on said one member and adjustable with respect to said switch means, and a cam arm carried by said plate for actuating the switch means when said one member is rotated from an initial position to a final position.

5. A missile cart roll mechanism comprising an elevatable frame, rotatable circular supporting means mounted on said frame in clamping engagement with a missile to be rotated in either of two directions, a control circuit for receiving a command signal, means including signal responsive means in said control circuit for rendering said control circuit effective, means including a motor in driving connection with said supporting means for rotating the supporting means as the circuit is rendered effective, first switch means included in said circuit and operated when the supporting means has been rotated a predetermined amount in either of said two directions, actuating means on the supporting means, said actuating means including a plate adjustably mounted on the supporting means and cam means carried thereby in the path of travel and engageable with the first switch means for operating the switch means when the supporting means has been rotated said predetermined amount in either of said two directions, second switch means included in said circuit, relay means connected to said second switch means and cooperating therewith for rendering said circuit ineffective to reset said control circuit and stop the motor as said first switch means is operated by the supporting means during rotation of said supporting means, and a source of electrical energy connected to said control circuit.

6. A missile cart roll mechanism comprising an elevatable frame, circular supporting means rotatably mounted on said frame in clamping engagement with a missile to be rotated in either of two directions, means including a motor in driving connection with said supporting means for rotating the supporting means in either of said two directions, means operatively connected to the motor for controlling the operation of the motor in one direction, additional means operatively connected to the motor for controlling the operation of the motor in the other direction, an actuating device adjustably mounted on said supporting means, cam means carried by said actuating device, switch means carried by said frame electrically connected to the motor and actuated by said cam means for interrupting the operation of the motor when the supporting means has been rotated a predetermined amount in one direction, additional switch means carried by said frame electrically connected to the motor and actuated by said cam means for interrupting the operation of the motor when the supporting means has been rotated a predetermined amount in the other direction, and means including a manually operated spring biased control element electrically connected to the motor.

7. A missile cart roll mechanism comprising an elevatable frame, annular missile supporting means rotatably mounted on said frame in clamping engagement with the missile to be rotated, means responsive to a first command signal for effecting rotation of said supporting means to a first position, means responsive to a second command signal for effecting rotation of said supporting means to a second position, means responsive to a third command signal for effecting rotation of the supporting means to a third position, means for selectively supplying a command signal to said responsive means, switch means operatively connected to each of said responsive means, actuating means adjustably mounted on said supporting means, and cam means carried by said actuating means and engageable with said switch means for selectively interrupting said command signals as the supporting means reaches said first, second and third positions.

8. A missile cart roll mechanism comprising an elevatable frame, annular missile supporting means rotatably mounted on said frame in clamping engagement with the missile to be rotated, a first control circuit, a second control circuit and a third control circuit, means included in said first control circuit for rendering the first control effective, means included in said second control circuit for rendering the second control circuit effective, means included in said third control circuit for rendering the third control circuit effective, means including a motor in driving connection with said supporting means and operatively connected to said first, second, and third control circuits for selectively moving the supporting means into first, second and third positions as the first, second and third control circuits are rendered effective, switch means included in each of said control circuits, actuating means adjustably mounted on the supporting means, and cam means carried by the actuating means and engageable with the switch means for selectively interrupting said first, second and third control circuits as the supporting means reaches each of said positions.

References Cited in the file of this patent
UNITED STATES PATENTS

| | | |
|---|---|---|
| 758,191 | Robertson | Apr. 26, 1904 |
| 1,407,690 | Berry | Feb. 28, 1922 |
| 1,555,295 | Kintzing | Sept. 29, 1925 |
| 1,880,477 | Ragsdale | Oct. 4, 1932 |
| 2,061,787 | Warner | Nov. 24, 1936 |
| 2,062,135 | Lilja | Nov. 24, 1936 |
| 2,340,910 | Truesdale | Feb. 8, 1944 |
| 2,613,822 | Stanley | Oct. 14, 1952 |
| 2,806,553 | Eames | Sept. 17, 1957 |
| 2,896,909 | Taylor | July 28, 1959 |
| 2,920,773 | Knabe | Jan. 12, 1960 |
| 2,921,784 | Miller | Jan. 19, 1960 |